(12) United States Patent
Hagerty

(10) Patent No.: US 9,565,850 B2
(45) Date of Patent: Feb. 14, 2017

(54) TRAP BRACKET

(71) Applicant: Jeffry Stewart Hagerty, Onsted, MI (US)

(72) Inventor: Jeffry Stewart Hagerty, Onsted, MI (US)

( * ) Notice: Subject to any disclaimer, the term of this patent is extended or adjusted under 35 U.S.C. 154(b) by 0 days.

(21) Appl. No.: 14/756,349

(22) Filed: Sep. 1, 2015

(65) Prior Publication Data

US 2016/0278364 A1    Sep. 29, 2016

Related U.S. Application Data

(60) Provisional application No. 62/177,892, filed on Mar. 26, 2015.

(51) Int. Cl.
*A01M 23/28* (2006.01)
*A01M 23/24* (2006.01)

(52) U.S. Cl.
CPC .................... *A01M 23/245* (2013.01)

(58) Field of Classification Search
CPC ............................ A01M 23/00; A01M 23/245
USPC ........................................ 43/96, 97; 248/300
See application file for complete search history.

(56) References Cited

U.S. PATENT DOCUMENTS

| | | | |
|---|---|---|---|
| 1,365,478 A * | 1/1921 | Genett ................... | A01M 23/00 43/97 |
| 1,368,813 A * | 2/1921 | Lazenby .............. | A01M 23/245 43/96 |
| 1,523,690 A | 1/1925 | Horton | |
| 1,660,719 A | 2/1928 | Murray | |
| 2,275,737 A | 3/1942 | Dacey | |
| 2,720,050 A * | 10/1955 | Pfeiffer ................. | A01M 23/00 43/96 |
| 2,918,748 A * | 12/1959 | Oesch ................. | A01M 23/245 43/96 |
| 3,016,225 A * | 1/1962 | Hughes ................. | E01C 19/502 248/122.1 |
| 4,184,282 A * | 1/1980 | Lifshutz ................ | A01M 23/26 43/90 |
| 4,240,223 A | 12/1980 | Medvetz et al. | |
| 4,557,068 A * | 12/1985 | Thomas ................ | A01M 23/26 43/90 |
| 4,766,694 A * | 8/1988 | Buckley .............. | A01M 23/245 177/25.19 |
| 6,731,250 B1 * | 5/2004 | Berman ............... | H01Q 1/1221 343/878 |
| 6,766,992 B1 * | 7/2004 | Parker .................... | F16M 13/02 248/218.4 |

(Continued)

*Primary Examiner* — Richard G Davis
(74) *Attorney, Agent, or Firm* — Timothy S. Stevens; Karen L. Kimble

(57) ABSTRACT

An article of manufacture for use by trappers of fur bearing animals. The article of manufacture consists of a body having a plurality of circular apertures therethrough and a plurality of elongated apertures therethrough. And, a method for positioning a trap for trapping a fur bearing animal, the method using the article of manufacture provided the trap has a tang, by the steps of: (a) positioning the article of manufacture to an object; and (b) inserting said tang into one of the elongated apertures of the article. If the trap does not have a tang, but does have a coil spring, then a clip having a tang can be inserted into the spring to adapt the trap for positioning according to the method of the instant invention.

6 Claims, 5 Drawing Sheets

(56) References Cited

U.S. PATENT DOCUMENTS

| | | | |
|---|---|---|---|
| 7,421,822 B1* | 9/2008 | Ley | A01M 23/245 43/88 |
| 7,758,003 B2* | 7/2010 | Pourtier | E04B 9/18 248/300 |
| 8,443,569 B2* | 5/2013 | Sias | E04B 7/063 248/300 |
| 8,727,300 B2* | 5/2014 | Maier | F16M 7/00 248/300 |
| 8,979,043 B2* | 3/2015 | Florman | F21V 21/00 248/152 |
| 9,123,987 B2* | 9/2015 | Lettkeman | F16M 13/02 |
| 2011/0187624 A1* | 8/2011 | Lettkeman | H01Q 3/02 343/882 |
| 2012/0162044 A1* | 6/2012 | Lettkeman | H01Q 1/1221 343/880 |

* cited by examiner

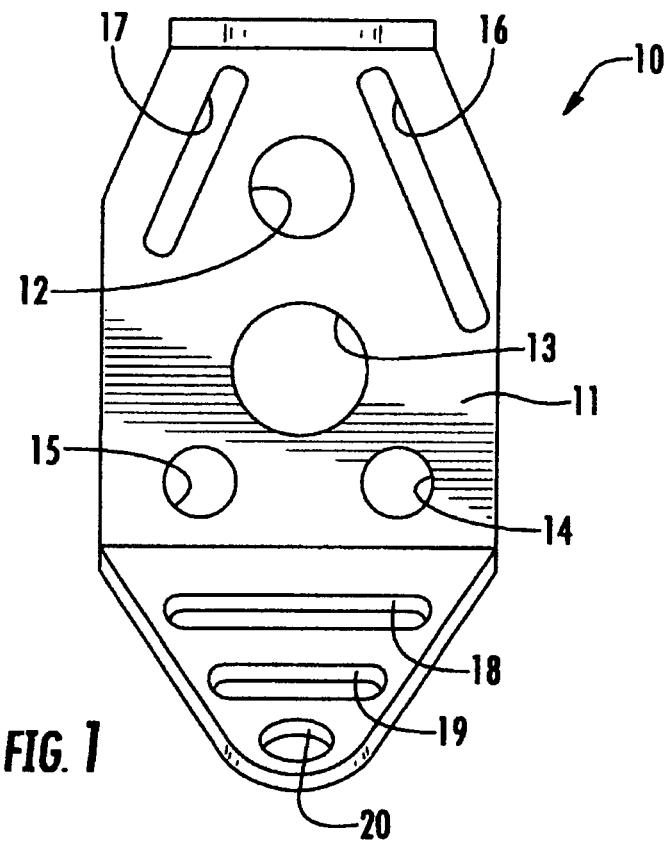
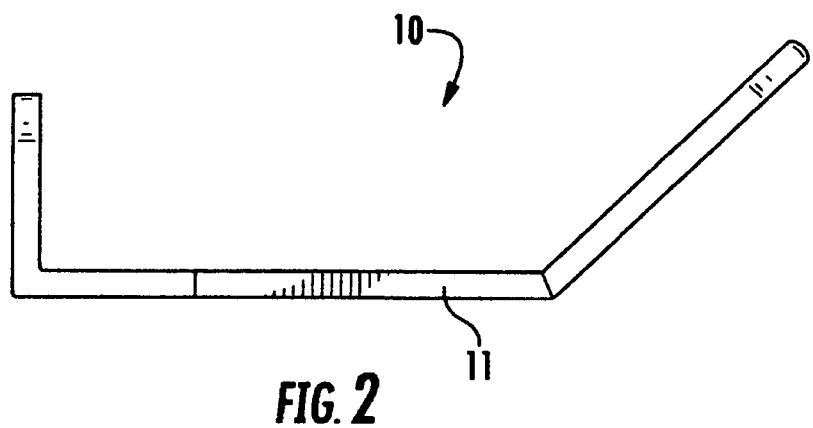

US 9,565,850 B2

TRAP BRACKET

BACKGROUND OF THE INVENTION

The instant invention relates to the trapping of fur bearing animals such as muskrat, mink and raccoon. The instant invention is an article of manufacture (herein called a "bracket") that has a number of applications in this field. In the long history of trapping fur bearing animals, a number of useful articles of manufacture have been disclosed. For example, U.S. Pat. No. 1,523,690 discloses a holding device for animal traps comprising a body having two circular apertures and one elongated aperture. U.S. Pat. No. 1,660,719 disclosed a nonreturn link for animal traps comprising a body having a circular aperture and an elongated aperture. U.S. Pat. No. 2,275,737 disclosed a bent planar metal slide member having two circular apertures therethrough in a system for trapping fur bearing animals.

Generally, the trapper possesses multiple devices each serving a single purpose and to be utilized for a single trap type. The devices are stabilizing brackets, slide and drowner locks, terminal swivels and stake swivels. Such devices can be cumbersome, equate to a higher accumulative expense and often are inadvertently left behind when needed. Additionally, there is no easy way to stabilize a trap on an object such as a rock, a log, a culvert, etc., generally due to the odd shape of the object. Furthermore, trap manufacturers utilize different steel thickness, width and tang lengths making it extremely difficult to place a trap. For instance, traps with a longer tang that extends to the jaw edge (when set) can utilize a notch or crack in a log, etc., however traps with a shorter tang length cannot utilize such notches or cracks. It would be an advance in the art if a device were discovered that not only overcame the above mentioned problems but provided other benefits as well.

SUMMARY OF THE INVENTION

The instant invention is the discovery of a device that not only overcomes the above mentioned problems but provides a number of other benefits as well. The instant invention is an article of manufacture (herein called a "bracket"), comprising a body, the body comprising a plurality of circular apertures therethrough and a plurality of elongated apertures therethrough. Preferably, the body comprises a planar shaped mid-section comprising at least one of the circular apertures and a planar shaped first end section intersecting with the planar shaped mid-section at an angle, the planar shaped first end section comprising at least one of the elongated apertures and at least one of the circular apertures. More preferably, the body comprises a planar shaped mid-section comprising at least one of the circular apertures and a planar shaped first end section intersecting with the planar shaped mid-section at an angle, the planar shaped first end section comprising at least one of the elongated apertures and at least one of the circular apertures and a planar shaped second end section intersecting with the planar shaped mid-section at an angle, the planar shaped second end section comprising at least one of the circular apertures.

The instant invention is also a method for positioning a trap for trapping a fur bearing animal, the method using the article of manufacture of the instant invention when the trap comprises a tang. The method comprises the steps of: (a) positioning the article of manufacture of the instant invention to an object; and (b) inserting said tang into one of the elongated apertures of the article.

The instant invention is also a method for positioning a trap for trapping a fur bearing animal, the method using the article of manufacture of the instant invention when the trap comprises a coil spring. The method comprises the steps of: (a) positioning the article of manufacture of the instant invention to an object; (b) engaging a clip having a tang into the coil spring so that the tang extends from the coil spring; and (c) inserting said tang into one of the elongated apertures of the article.

BRIEF DESCRIPTION OF THE DRAWINGS

FIG. 1 is a top view of a highly preferred embodiment of the instant invention;

FIG. 2 is a side view of the embodiment shown in FIG. 1;

DETAILED DESCRIPTION OF THE INVENTION

Figure 3:
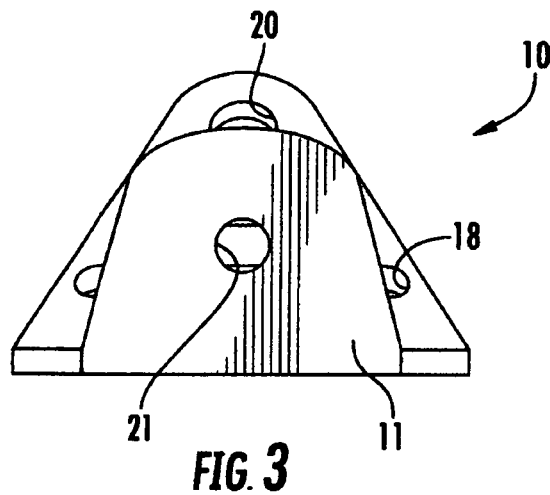
FIG. 3 is an end view of the embodiment shown in FIG. 1.

Referring now to FIG. 1, therein is shown a highly preferred bracket 10 of the instant invention. The body 11 bracket 10 comprises a planar shaped mid-section having circular apertures 12, 13, 14 and 15 therethrough and elongated apertures 16 and 17 therethrough. The body 11 also comprises a planar shaped first end section intersecting at a 70 degree angle with the planar shaped mid-section, the planar shaped first end section comprising elongated apertures 18 and 19 and circular aperture 20. The body 11 also comprises and a planar shaped second end section intersecting with the planar shaped mid-section at an angle of 90 degrees, the planar shaped second end section comprising the circular aperture 21 shown in FIG. 3. FIG. 2 is a side view of the bracket 10. FIG. 3 is an end view of the bracket 10 showing circular aperture 21 as well as a partial view of circular aperture 20. The preferred material of construction for the body 11 is steel but the body 11 can be made of any suitable material such as fiber reinforced injection molded plastic. The preferred shape for the body 11 is the shape shown in FIGS. 1 and 2 but any suitable shape can be used.

Figure 4:
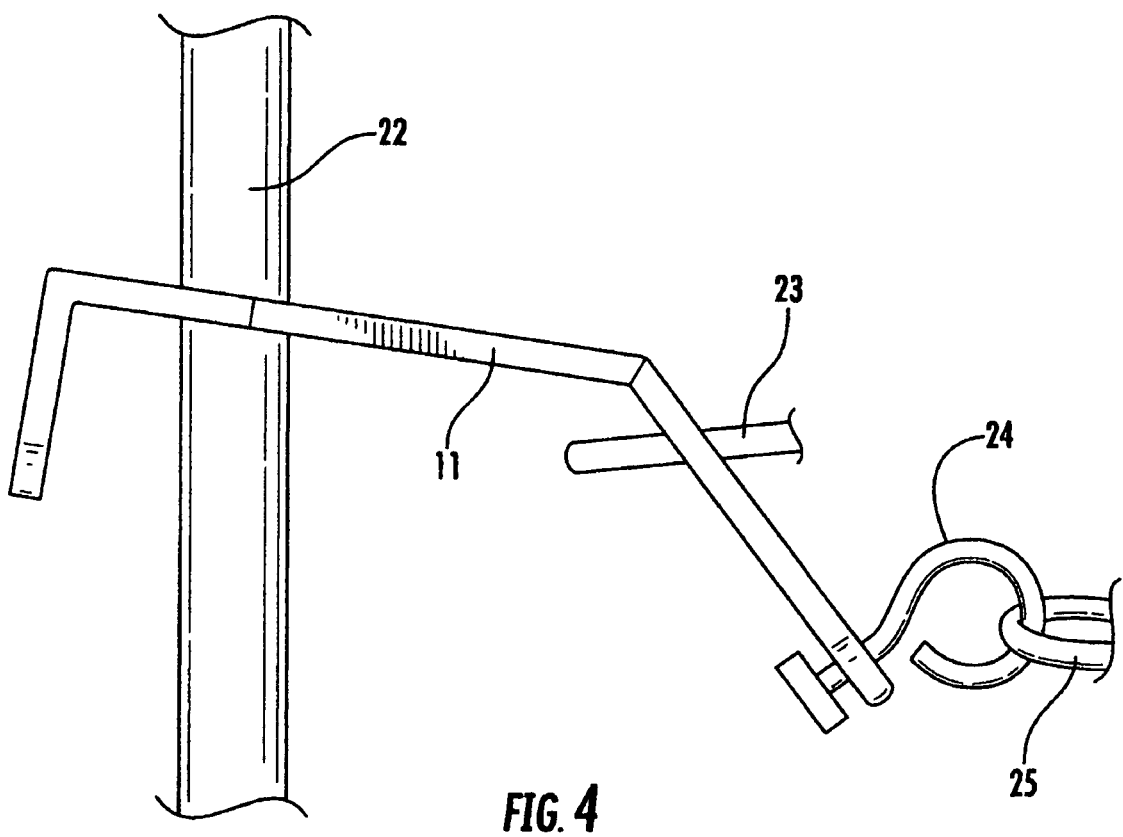
FIG. 4 is a side view of the embodiment shown in FIG. 1 mounted on a pole through one of the circular apertures thereof with the tang of a trap positioned in one of the elongated apertures thereof and a J-hook mounted in another of the circular apertures thereof.

Referring now to FIG. 4, therein is shown the bracket 10 of FIG. 1 mounted on a pole 22 positioned through aperture 12 of the bracket 10 of FIG. 1. The tang 23 of a trap (shown broken away) is shown positioned through elongated aperture 18 of the bracket 10 of FIG. 1. The chain 25 of the trap (also shown broken away) is attached to the J-hook 24. The term "J-hook" is well known in the art and alternatively can be described as a variety of open end eye bolt. It should be understood that although a J-hook is preferred, other means of providing an attachment can be used such as an S-hook, a quick link, a spring hook, a split ring or even a loop of wire. It will be appreciated that if the pole 22 is driven into the ground or the bottom of a body of water with the pole 22 in the vertical position, the body 11 will jam or wedge against the pole 22 to hold the body 11 in place on the pole provided that the circular aperture 12 is larger than the diameter of the pole 22 but not too much larger. The weight of the trap on the bracket holds the bracket on the rod 22 after the bracket has been slid onto the rod and positioned as desired on the rod 22.

Figure 5:
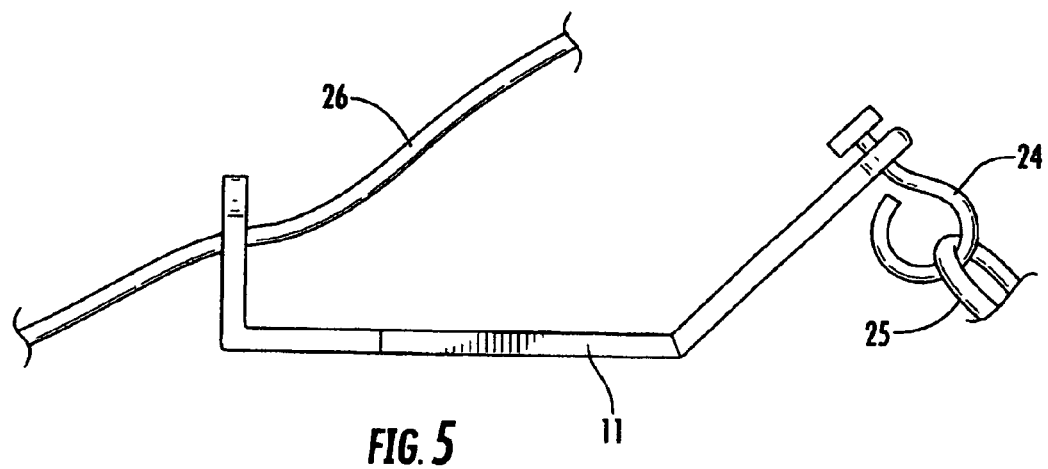
FIG. 5 is a side view of the embodiment shown in FIG. 1 with a wire positioned through one of the circular apertures thereon and a J-hook bolt mounted in another of the circular apertures thereof.

The bracket of the instant invention has a number of additional applications. Referring now to FIG. 5, a slide wire 26 is shown through the circular aperture 21 of the bracket 10 shown in FIG. 3 so that the bracket 10 can be used as a slide lock. Slide locks are used by trappers for moving the target animal out of the trap bed.

Figure 6:
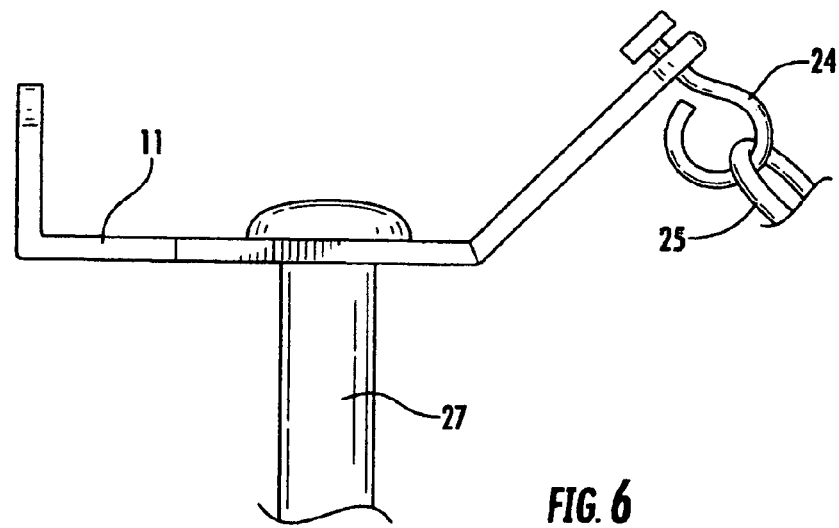
FIG. 6 is a side view of the embodiment shown in FIG. 1 mounted on a stake through one of the circular apertures thereof and a J-hook mounted in another of the circular apertures thereof.

Referring now to FIG. 6, therein is shown the bracket 10 of FIG. 1 used as a stake swivel. The bracket 10 is staked to the ground by stake 27 through circular aperture 13 thereof. Trap chain 25 (shown broken away) is attached to J-hook 24 attached to body 11 by way of circular aperture 20 in body 11.

Figure 7:
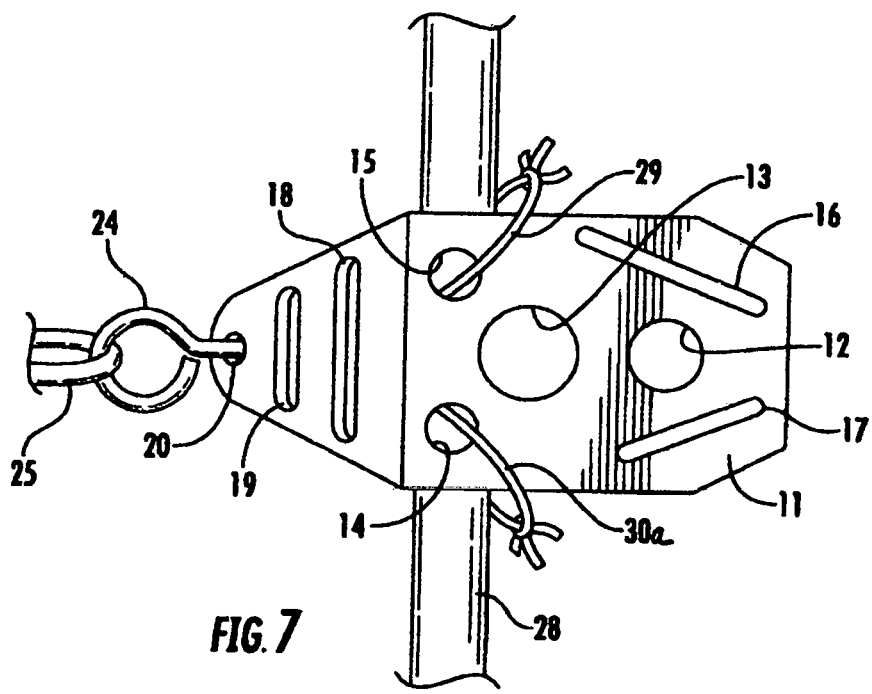
FIG. 7 is a view of the embodiment shown in FIG. 1 mounted on a pole by passing wires around the pole and through two of the circular apertures thereof and a J-hook bolt mounted in another of the circular apertures thereof.

Referring now to FIG. 7, therein is shown the bracket 10 of FIG. 1 tied to rod 28 by wires 29 and 30a wrapped around rod 28 and passed through circular apertures 14 and 15 in the body 11. In this position, the tang of a trap can be positioned in the elongated aperture 16 or the elongated aperture 17. Trap chain 25 (shown broken away) is attached to J-hook 24 attached to body 11 by way of circular aperture 20 in body 11. Although FIG. 7 shows the bracket 10 of FIG. 1 attached to a rod, it should be understood that the bracket 10 can also be wired or otherwise attached to any convenient object such as a tree, stick, tree limb, tree root, rock, culvert, drain tile, or board that may be at hand. Although FIG. 7 shows two wires 29 and 30a, it should be understood that a single wire or other such means (such as cord or cable or screw or nail or staple) can be used.

Figure 8:
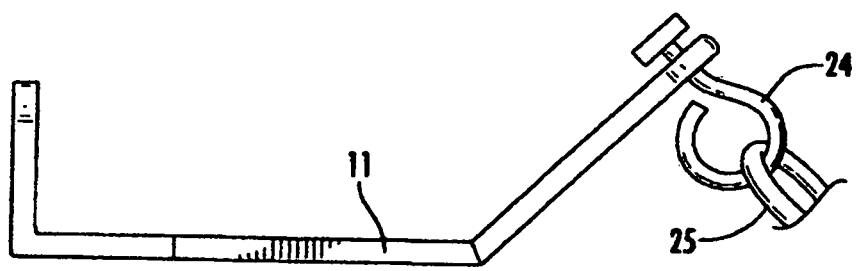
FIG. 8 is a side view of the embodiment shown in FIG. 1 with a J-hook mounted in one of the circular apertures thereof.

Referring now to FIG. 8, therein is shown the bracket 10 of FIG. 1 used as a terminal swivel by way of chain 25 (shown broken away) attached to J-hook 24 attached to body 11 by way of circular aperture 20 in body 11.

Figure 9:
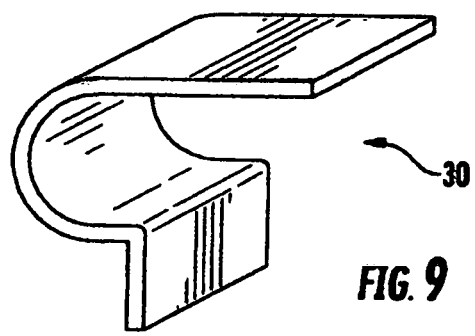
FIG. 9 is a side view in perspective of a clip to be inserted in the coil spring of the body hold trap shown in FIG. 10.
Figure 10:
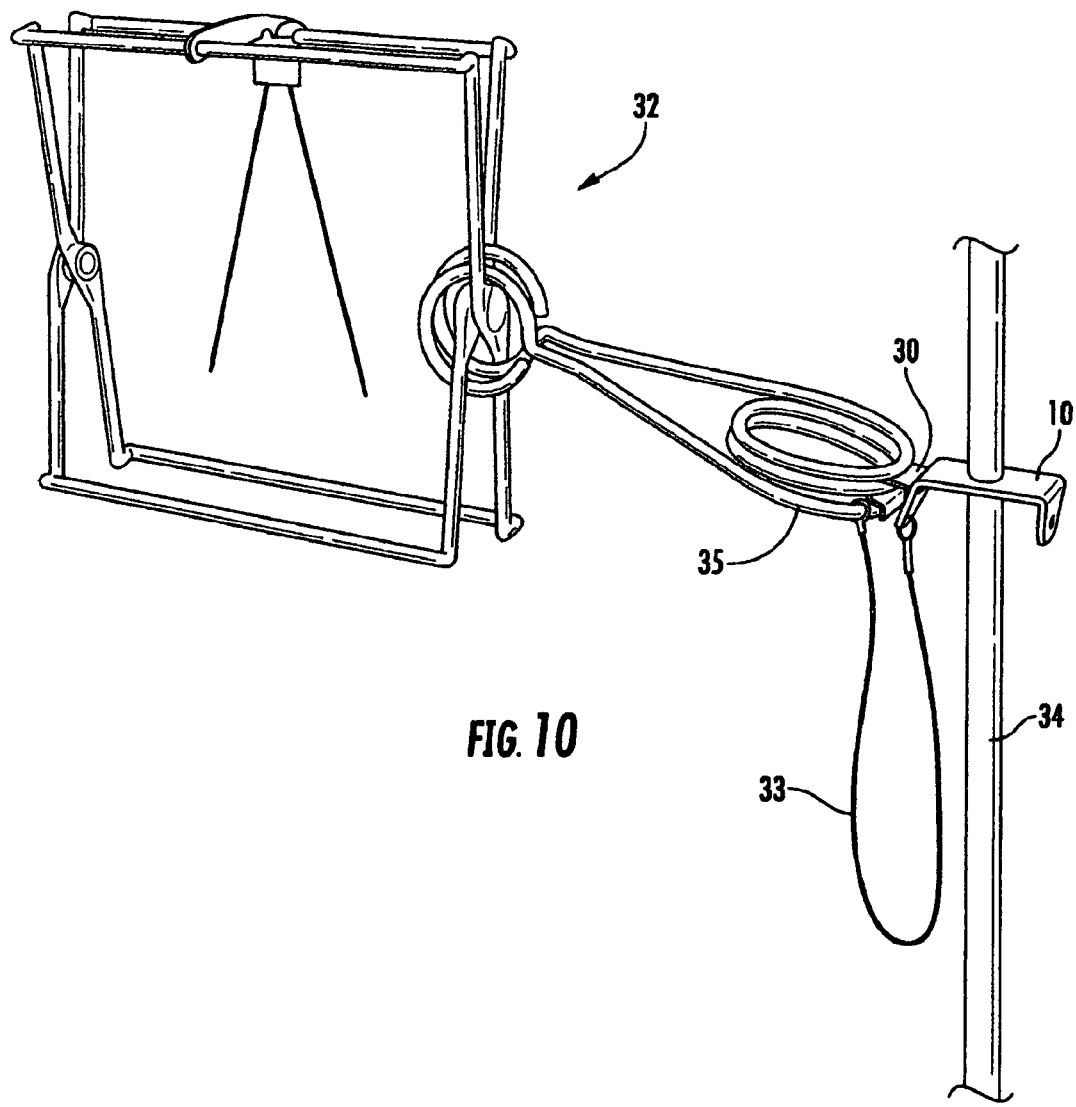
FIG. 10 is a side view in perspective of a body hold trap mounted on a pole by way of the bracket of FIG. 1 and the clip of FIG. 9 inserted into the coil spring of the body hold trap.

Referring now to FIG. 10, therein is shown a body hold trap 32 (sometimes called a body grip trap) comprising a coil spring 35. A clip 30 (shown in detail in FIG. 9) formed of a strip of steel is shown inserted into one of the coils of the coil spring 35. The tang of the clip 30 is shown inserted into one of the elongated apertures of bracket 10. Bracket 10 is positioned on pole 34 in the same manner as shown in FIG. 4. Cable 33 is connected at one end thereof to coil spring 35 and at the other end thereof to bracket 10. It will thus be appreciated that the bracket of the instant invention can be used to stabilize and position not only traps that have a tang such as most foot hold traps but also other traps such as dog proof traps or body hold trap that are adapted to engage with one of the elongated apertures of the bracket of the instant invention.

The term "circular" used herein means generally circular or elliptical and should not be construed as meaning perfectly circular. The term "tang" used herein means, for example and without limitation thereto, the distal end of a base component of a trap, such as the V-shaped distal end of the base 11 of the trap shown in FIG. 9 of U.S. Pat. No. 4,557,068 and the distal end of the clip shown in FIG. 9. In the art, the tang of a trap is sometimes referred to as a "trap frame end" or a "trap frame bridge end". U.S. Pat. No. 4,240,223 referred to the tang (element 4) as the "frame down turned end".

CONCLUSION

While the instant invention has been described above and claimed below according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains

What is claimed is:

1. A method for positioning a trap for trapping a fur bearing animal, the method using an article of manufacture comprising a body comprising a plurality of circular apertures therethrough and a plurality of elongated apertures therethrough, said trap comprising a tang, the method comprising the steps of: (a) positioning the article of manufacture to an object; and (b) inserting said tang into one of the elongated apertures of the article.

2. The method of claim 1, wherein the object is a pole.

3. The method of claim 1, wherein the object is selected from the group consisting of a tree, a stick, a tree limb, a tree root, a rock, a culvert, a drain tile, or a board.

4. A method for positioning a trap for trapping a fur bearing animal, the method using the article of manufacture comprising a body comprising a plurality of circular apertures therethrough and a plurality of elongated apertures therethrough, said trap comprising a coil spring, the method comprising the steps of: (a) positioning the article of manufacture to an object; (b) engaging a clip having a tang into the coil spring so that the tang extends from the coil spring; and (c) inserting said tang into one of the elongated apertures of the article.

5. The method of claim 4, wherein the object is a pole.

6. The method of claim 4, wherein the object is selected from the group consisting of a tree, a stick, a tree limb, a tree root, a rock, a culvert, a drain tile, or a board.

* * * * *